United States Patent [19]

Caillé

[11] Patent Number: 4,588,597
[45] Date of Patent: * May 13, 1986

[54] PROCESS FOR PRODUCING A ROLLED CHEESE

[75] Inventor: Michel Caillé, Les Aix d'Angillon, France

[73] Assignee: Laiteries Hubert Triballat, D'Angillon, France

[*] Notice: The portion of the term of this patent subsequent to Jan. 29, 2002 has been disclaimed.

[21] Appl. No.: 669,251

[22] Filed: Nov. 7, 1984

Related U.S. Application Data

[63] Continuation of Ser. No. 444,382, Nov. 26, 1982, Pat. No. 4,496,593, which is a continuation of Ser. No. 247,208, Mar. 24, 1981, abandoned.

[30] Foreign Application Priority Data

Apr. 18, 1980 [FR] France ............................. 80 07844

[51] Int. Cl.⁴ ........................ A23C 19/06; A23P 1/00
[52] U.S. Cl. .................................... 426/297; 99/457; 426/491; 426/512; 426/582
[58] Field of Search ................. 426/89, 289, 302, 297, 426/36, 130, 582, 517, 396, 124, 512, 478, 491; 99/457, 458, 459; 425/84

[56] References Cited

U.S. PATENT DOCUMENTS

| | | |
|---|---|---|
| 3,172,372 | 3/1965 | Packman . |
| 3,798,343 | 3/1974 | Vitale . |
| 3,904,772 | 9/1975 | Moegle . |
| 3,966,045 | 6/1976 | Perdue . |
| 4,012,530 | 3/1977 | Holden . |

FOREIGN PATENT DOCUMENTS 1039039  10/1953  France .

OTHER PUBLICATIONS

"Cheese" by J. G. Davis, vol. III, (pp. 831–832), 1976.

*Primary Examiner*—George Yeung
*Attorney, Agent, or Firm*—Parkhurst & Oliff

[57] ABSTRACT

A rolled cheese and a process for making the cheese is described. The cheese comprises a layer of fresh cheese curd coated with flavoring such as herbs, which is rolled into a spiral. The fresh cheese curd is neither cooked nor kneaded, and the resulting rolled cheese has two distinct layers which each contain a distinctive taste.

8 Claims, 4 Drawing Figures

PROCESS FOR PRODUCING A ROLLED CHEESE

This is a continuation of application Ser. No. 444,382 filed Nov. 26, 1982, U.S. Pat. No. 4,496,593, which in turn is a continuation of Ser. No. 247,208 filed Mar. 24, 1981, now abandoned.

In order to prepare a cheese which is speckled with herbs, it is known to knead a mixture of fresh or soft curds and herbs. The distribution of the herbs, which are finely divided in the mass, is excellent. However, this kneading produces a short-textured curd which becomes granular and sticky, crumbles when cut and is not popular with consumers.

French utility certificate No. 78.34570 describes a block cheese made from processed cheese and a layer of natural cheese. The processed cheese holds together the layer of natural cheese which is more crumbly. This block of cheese is not to the taste of those who like natural cheeses or cheeses made from fresh or soft curds which have not been subjected to kneading or cooking. Moreover, it does not contain any nondairy substances or flavorings such as pepper, herbs, walnuts, hazelnuts or ground almonds, raisins, etc.

The invention overcomes these disadvantages by providing a cheese made from fresh curds which have not been subjected to any kneading or cooking. As a result, the cheese's qualities of flavor and appearance are unimpaired, but the cheese is nevertheless flavored with a flavoring which is adequately distributed in the mass, but remains distinct from the cheese, so that the mellow flavor of the cheese and the pronounced flavor of the herbs are tasted separately. In comparison, in a kneaded product the two flavors combine to form a single flavor.

Moreover, the production of a cheese flavor with garlic and fine herbs without kneading gives a firmer texture than usual. This cheese can therefore be placed on a cheese board without any difficulty, unlike kneaded cheeses containing garlic and fine herbs.

The cheese according to the invention, having fresh curds, incorporates a coating of flavoring rolled in a spiral. Preferably, the layer of curds is also rolled in a spiral surrounding the coating of flavoring, in the manner of a Swiss roll.

The regular variation in the length of the polar radius of the spiral of the coating ensures that the flavoring is distributed in the cheese in a sufficiently homogeneous manner to ensure that the flavoring is found in each mouthful. However, since the flavouring does not have to be finely divided and distributed in the mass of the curds, there is no need for the curds to be either kneaded or even broken up. With some curds, the layer of curds may not stay in a spiral to start with. This disadvantage is overcome by the use of a casing, which may be inedible or edible, which holds the outer coil of the layer of curds in place and may also serve as a wrapper to protect the cheese.

Rolled cheese made from fresh curds is particularly preferred.

The invention also relates to a process for preparing rolled cheese which comprises forming a continuous, unbroken, non-kneaded layer of fresh curds, placing a coating of flavoring on the layer, and rolling the layer and the coating into a spiral.

Preferably, this rolling operation is carried out when the cheese still has a moisture content greater than the level which is appropriate for consumption. When the cheese has a high moisture content, it rolls up more easily. Thus, for example, the dry extract of the curds at the time of rolling may be less than 40%, preferably less than 38%, more particularly equal to about 35%.

The term "flavoring" here refers to any edible non-dairy substance, while the term "coating" does not rule out the possibility of a layer or bed of flavouring broken up into more or less thick pieces, or even a bed of separate pieces, although the coating should preferably be thin and uniform. Even when separate pieces are used, the distribution of these pieces obtained by encrustation in the layer of curds in an incomplete spiral is much greater than the distibution which would be obtained if the pieces were merely encrusted on the upper surface of a cheese, whereas, to incorporate them in the mass would involve breaking it up.

In the accompanying drawings, which are given solely by way of example,

Figures 1, 2, 3, 4:
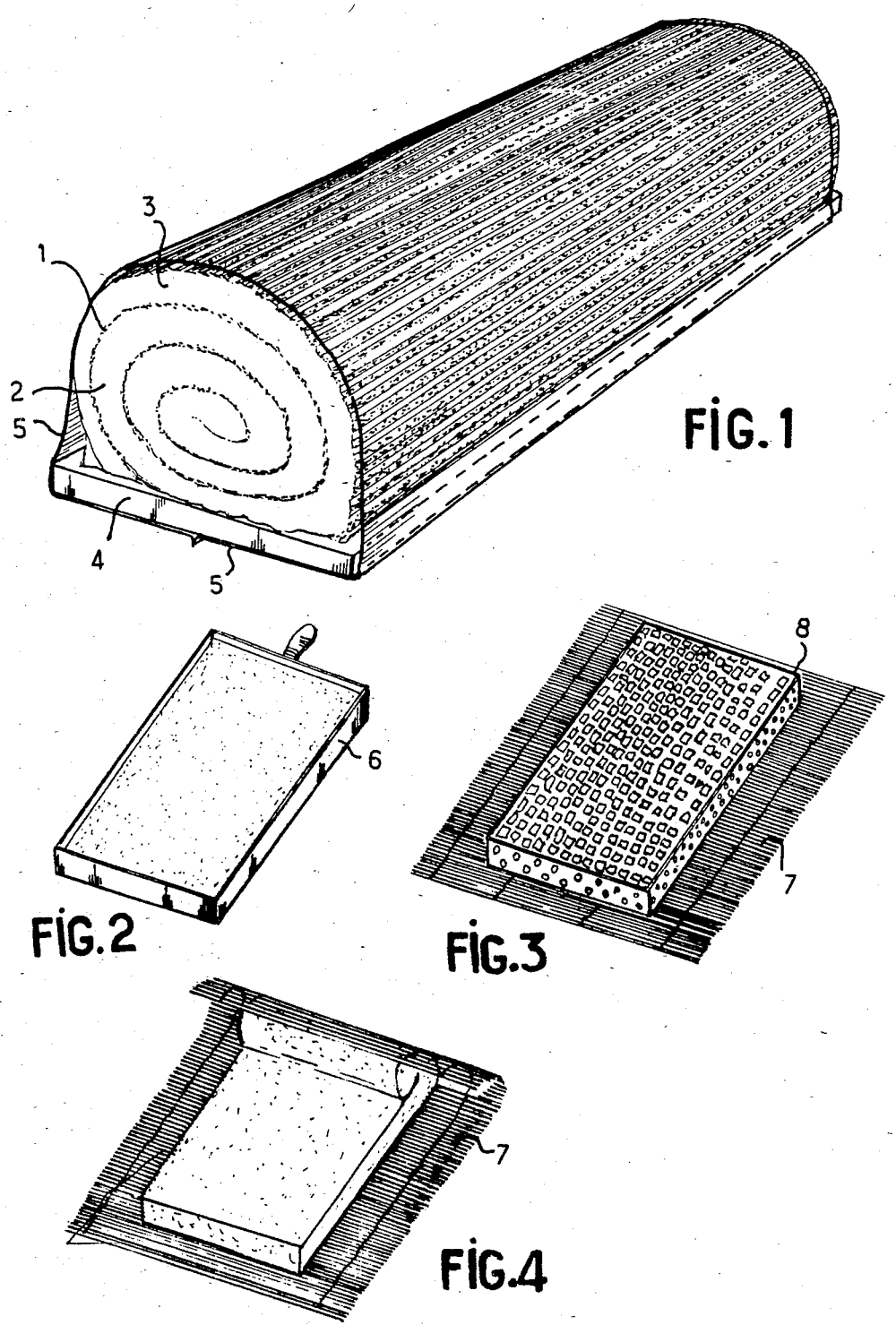
FIG. 1 is a perspective view of a cheese according to the invention.
FIGS. 2 to 4 illustrate three steps of the process for preparing a cheese according to the invention.

The cheese shown in FIG. 1 has a coating 1 of flavoring rolled in a spiral and a layer 2 of fresh curds rolled in a spiral around the coating 1 and in contact therewith. The outer surface of the cheese may be surrounded by a coating 3 of flavoring. The lower surface of the cheese rests on a polystyrene sheet. The sheet 4 and the cheese are wrapped together in a wrapping 5 of heat-shrinkable film. The thermowelding line of the wrapping runs under the sheet 4. A wrapping of aluminium foil or the like could also be used.

The following example illustrates the invention.

EXAMPLE (Referring to FIGS. 2 to 4 of the accompanying drawings).

Six liters of pasteurized skimmed milk and 1.5 liters of pasteurized cream are mixed together so as to obtain a fat content of 72 grams/liters. Mixing is carried out at 26° C. and Flora Danica acidic leavens and flavoring ferments are added.

The mixture is left to mature for about three hours in the container 6 shown in FIG. 2.

The mixture is then coagulated with 0.5 cm$^3$ of rennet at between 21° and 25° C. in order to obtain milk curds. The coagulation process lasts about 22 hours.

A curd-cutter is used to cut the coagulated mixture into cubes with sides of about 5 cm.

As shown in FIG. 3, the product is then molded in a metal frame 8 with perforated walls on a straw mat 7 which has previously been sterilized, and is placed on a draining tray. The curds are placed in metal frame 8 using a stainless steel ladle, taking care not to break them. The curds are levelled using a spatula and a sterile mat is placed on the curds before a plate weighing about 3 kg is placed on top in order to compress the curds and ensure satisfactory exudation. The product is left to drain in this way for 20 hours at ambient temperature.

Finally, the product is removed from the mold and salted. At the same time, a coating of fine herbs is spread over one side of the layer of curds, a sterile mat is placed over this side, the whole product is turned over, and another layer of fine herbs is spread over the other surface. About 20 grams of fine herbs are put on.

The dry content of the curds is 37% by weight. The curds are rolled up, using a mat, in the manner of a Swiss roll (FIG. 4).

Draining is completed in a refrigerator at a temperature of from 5° to 7° C.

The next day, the cheese is placed on a polystyrene sheet and wrapped in a heat-shrinkable film of polyvinyl chloride. The packaged cheese is then placed in a tunnel where it is heated to between 70° and 75° C. for about 5 to 6 seconds. During heating the wrapping shrinks. The treatment in the oven is sufficiently rapid to ensure that the cheese itself is not heated enough to affect its quality.

The wrapped cheese is stored at between about 4° and 5° C.

When eaten, the curds of this rolled cheese are found to be very creamy. The cheese can be cut cleanly, is not granular, does not crumble, and is easy to spread. The flavor obtained is not that of a herb butter masking the flavor of the natural fresh cheese as found in the usual products in which milk curds are combined with a flavoring. The cheese has a solids content of at least 40% and weighs about 1.7 kg.

EXAMPLE 2

Six liters of pasteurized skimmed milk and 1.5 liters of pasteurized cream are mixed together so as to obtain a fat content of 72 grams/liter. Flora Danica acidic leaven and flavoring ferments are added. The mixture is subjected to coagulation, in an attempt to obtain fairly substantial rennet curds, by adding 2.25 $cm^3$ of rennet at a temperature of 35° C. The room temperature is about 30° C. The setting time is about ten minutes while the hardening time is about 45 minutes.

Using a curd-cutter, the curds are cut into portions the size of a seed of corn. These are left to stand for ten minutes and then the grains are mixed for five minutes. These operations are repeated three times.

About 60% of whey is drawn off and the grains are washed with slightly salted water at a temperature of about 30° C.

The product is molded and rolled up as in the previous example except that rolling is carried out three hours after molding, depending on the speed of draining. The solids content at the time of rolling up is 38%.

The next day, the product is salted by keeping it in brine for 30 minutes. The density of the brine is 1200. The product is then sprayed with *Penicillium candidum*.

The cheese is then packaged as in the previous example.

In this way, a cheese is obtained having solubilized curds, which resembles a Swiss roll. The cheese weighs about 1.5 kg, it is 30 cm long, 25 cm in diameter, has a minimum solids content of 50% and the fat content of the solids is at least 65%, as in the case of the cheese according to Example 1.

EXAMPLE 3

The same raw materials as in Example 1 are mixed together in order to give a fat content of 72 grams/liter. Mixing is carried out at 32° C. and coagulation is carried out using 1.5 $cm^3$ of rennet. The setting time is about 8 to 9 minutes. The hardening time is about 50 minutes. The product is molded as in Example 1 and then rolled up, again as in Example 1, 2½ hours after molding. The solids content at the time of rolling is 39% by weight. The product is salted as in Example 2 by keeping it in brine for 30 minutes and then sprayed with *Penicillium candidum* as in Example 2. It is wrapped in film as in Example 1.

A molded cheese with soft curds is obtained, resembling a Swiss roll. The solids content is at least 50%, the fat content of the solids is at least 65%, the cheese weighs 1.5 kg, it is 30 cm long and 25 cm in diameter.

What I claim:

1. A process for producing a cheese with a layer of flavoring distributed in the cheese, comprising the successive steps of:
   (a) molding uncooked fresh curds into a continuous, unbroken molded layer on a mat, said curds having a solids content of less than 40% by weight;
   (b) draining said molded layer;
   (c) placing a coating of herb containing flavoring on said molded layer to form a flavored layer;
   (d) rolling said flavored layer into a spiral to produce a rolled product, wherein said mat supports said flavored layer during said rolling operation; and
   (e) simultaneously refrigerating and further draining said rolled product.

2. A process for producing a cheese with a layer of flavoring distributed in the cheese, consisting of the successive steps of:
   (a) molding uncooked fresh curds into a continuous, unbroken molded layer on a first mat, said curds having a solids content of less than 40% by weight;
   (b) draining said molded layer;
   (c) placing a first coating of herb containing flavoring on a first surface of said molded layer;
   (d) placing a sterile second mat over said first coating;
   (e) removing said molded layer of fresh curds from the first mat;
   (f) placing a second coating of herb containing flavoring on a second surface of said molded layer to form a flavored layer;
   (g) rolling said flavored layer into a spiral to produce a rolled product, wherein said second mat supports said flavored layer during said rolling operation; and
   (h) simultaneously refrigerating and further draining said rolled product.

3. The process according to claim 1, wherein said fresh curds are drained during step (b) until the solids content of the curds is approximately 35%.

4. A process for producing a cheese with a layer of flavoring distributed in the cheese, comprising the successive steps of:
   (a) molding uncooked fresh curds into a continuous, unbroken molded layer;
   (b) draining said curds until they have a solids content of approximately 30% to less than 40% by weight;
   (c) placing a coating of herb containing flavoring on at least one side of said molded layer to form a flavored layer;
   (d) rolling said flavored layer into a spiral, using a mat which supports said flavored layer, to produce a rolled product; and
   (e) simultaneously refrigerating and further draining said rolled product.

5. The process according to claim 4, wherein step (e) is carried out at a temperature of from 5° to 7° C.

6. The process according to claim 1, wherein the mat used in step (a) is a flexible, porous straw mat.

7. The process according to claim 2, wherein the mat used in steps (a) and (d) are flexible, porous straw mats.

8. The process according to claim 4, wherein the mat used in step (d) is a flexible, porous straw mat.

* * * * *